3,151,099
WATER CURABLE ORGANOPOLYSILOXANES CONTAINING SILICIC ESTERS AND ZIRCONIC OR TITANIC ESTERS

Louis Frederic Ceyzeriat and Georges Leon Pagni, Lyon, France, assignors to Societe des Usines Chimiques Rhone-Poulenc, Paris, France, a French body corporate
No Drawing. Filed May 25, 1961, Ser. No. 112,515
Claims priority, application France May 30, 1960
10 Claims. (Cl. 260—46.5)

This invention relates to new liquid or viscous organopolysiloxane compositions capable of being converted into solid and elastic masses in the presence of water in liquid or vapour form. It relates more especially to compositions which can be cured without heating.

Numerous vulcanising systems have already been proposed for obtaining elastomeric products without heating from straight-chain diorganopolysiloxanes generally containing fillers. In most of these systems, use is made of a combination of two products added to the diorganopolysiloxane at the time of use, one of these products being intended to form bridges between the siloxane chains and the other acting as a curing catalyst.

The practical application of such methods therefore involves, as a preparatory stage, a mixing operation which is left to the user. This is a serious disadvantage, since it obliges every user to possess his own mixing equipment.

It was therefore desirable to be able to provide compositions which can be used without any preliminary operations having to be effected and which are of unvarying quality and stable in storage. Some compositions have already been proposed to this end, but they are not applicable to certain end uses because their curing is accompanied by liberation of acid.

Compositions have now been prepared which contain:
(a) A liquid diorganopolysiloxane of linear structure formed by the repetition of formula units $R_2SiO$ and terminated by hydroxyl groups,
(b) A silicic ester,
(c) A titanic or zirconic ester, and
(d) If desired, inert fillers and liquid diluents.

Such compositions, when kept away from moisture, are completely stable and, on contact with water in liquid or vapour form, are gradually converted into elastic solids without liberating any acid or alkaline product.

The diorganopolysiloxanes which can be used are liquids prepared by hydrolysis of a bifunctional diorganosilane of the formula $R_2SiX_2$ (in which R represents a halogenated or non-halogenated, aliphatic or aromatic hycarbon group, and X a hydrolysable grouping). The diorganosilane should be as free as possible from mono- or trifunctional derivatives. In the foregoing formula, R represents any monovalent hydrocarbon group, such as an alkyl group having from 1 to 3 carbon atoms, more especially methyl and ethyl, an alkenyl group such as vinyl and allyl, a cycloaliphatic group such as for example cyclohexyl, methylcyclohexyl or cyclohexenyl, an aryl group such as phenyl or tolyl, an aralkyl group, more especially benzyl, and hydrocarbon groups, such as those mentioned in the foregoing, substituted by one or more halogen atoms. X denotes a hydrolysable atom or group, such as halogen atoms, more especially chlorine, and the alkoxy groups, such as the ethoxy groups. The products produced by hydrolysis are thereafter subjected to condensation in the presence of an agent such as potassium hydroxide or hydrochloric acid. It is to be understood that the siloxanes may be homopolymers or copolymers and that the organic groups attached to one and the same silicon atom may differ. They are linear polysiloxanes whose structural unit is $R_2SiO$, where the R radicals have the same significance as for the diorganosilane from which they were derived, the chain being terminated by hydroxyl groups.

The viscosity of the diorganopolysiloxanes which may be employed in accordance with the invention may be between 500 and 500,000 centistokes at 25° C., and is preferably between 2,000 and 50,000 centistokes. In these organopolysiloxanes, the chains are terminated by hydroxyl groups each attached to a silicon atom. The number of such hydroxyl groups is at least 0.1 to 100 silicon atoms in the chain.

The fillers usually employed for the compositions under consideration are finely divided mineral solids such as silica obtained by combustion or precipitation, the natural silicas, alumina, zinc oxide, titanium dioxide, calcium carbonate, calcium or barium sulphate, or fibrous products such as asbestos. Of these fillers, silicas obtained by combustion are of special interest for obtaining cured products having good mechanical properties.

The silicic esters in the compositions according to the invention are products of formula $Si(OR')_4$, in which R' represents an alkyl group containing from 1 to 18 carbon atoms, such as ethyl n-propyl, isopropyl, butyl, 2-ethylhexyl, palmityl (hexadecyl), stearyl (octadecyl), a benzene group such as phenyl, an aralkyl group such as benzyl, or a cycloaliphatic group such as cyclohexyl or methylcyclohexyl. Although the nature of the groups R' is not critical, the silicic esters of alcohols having a low number of carbon atoms are especially useful, for example ethyl or isopropyl orthosilicate. The orthosilicate may be entirely or partly replaced by products of condensation emanating from the partial hydrolysis of these esters and containing up to 25 silicon atoms per molecule.

With regard to the titanic or zirconic esters employed, these are products of the general formulae $Ti(OR'')_4$ and $Zr(OR'')_4$, in which R'' represents an alkyl group containing at most 18 carbon atoms (which may be substituted by hydroxyl), or a cycloaliphatic group such as cyclohexyl or methylcyclohexyl. As examples of titanic or zirconic esters which may be employed, there may be mentioned the tetraethyl, tetraisopropyl, tetra(2-ethylhexyl), tetraoctadecyl and tetra(methylcyclohexyl)esters, and octyleneglycol titanate. As in the case of the silicic esters, the titanic and zirconic esters may be replaced entirely or partly by the products of condensation resulting from the hydrolysis of monomeric esters and containing up to 5 metal atoms per molecule of polycondensed product.

In some cases, it may be advantageous to have available fairly fluid compositions. This is achieved by adding an inert liquid to the aforesaid constituents. For this purpose, an aliphatic hydrocarbon, cycloaliphatic hydrocarbons such as cyclohexane, monomethylcyclohexane, or esters such as ethyl acetate may be employed. Commercial mixtures such as white spirit are also quite suitable.

The proportions of silicic and titanic or zironic esters or of their products of hydrolysis may vary within fairly wide limits. They are generally between 0.1% and 20% in the case of silicic esters and 0.1% and 5% in the case of titanic or zirconic esters. Percentages of silicic esters between 0.5% and 5% and titanic or zirconic esters between 1% and 2.5% are generally preferred. The proportions are to be understood to be by weight in relation to the weight of diorganopolysiloxane.

The choice of the proportions of silicic and titanic or zirconic esters depends upon the nature of the diorganopolysiloxane oil to be cured, upon the fillers present, upon the desired curing speed and upon the properties of the product which it is desired to obtain.

With regard to the mineral fillers, they may be used in a proportion of from 0% to 200% in relation to the weight of diorganopolysiloxane.

The compositions according to the invention may be conveniently prepared by mixing the reactants at room temperature in the absence of moisture in an apparatus provided with a stirrer and a discharging device for packing the product in a closed receptacle. In practice, first the silicic ester and then the titanic compound are successively added with stirring to the apparatus containing the well dehydrated diorganopolysiloxane. If a composition containing a filler is to be prepared, the organopolysiloxane and the filler are introduced into the apparatus, moisture is driven off by heating at about 130–150° C. and passing a current of dry nitrogen, whereafter the apparatus is cooled, and the silicic and titanic esters are then added. Again in the case of compositions containing a filler, it is advantageous to terminate the operation by heating the whole mixture at about 100° C. If the composition is to include a liquid diluent, the latter is added to the organopolysiloxane with the filler, if any, the moisture is driven off by azeotropic distillation and, after cooling, the silicic and titanic esters are added.

The products obtained, whose consistency varies from that of a liquid to that of a firm paste, are transferred into fluid-tight receptacles in which they can be kept for several months.

The compositions according to the invention may be employed for many applications. They are suitable more especially for sticking various articles such as Bakelite, metals, masonry, wood and glass. They can serve for caulking, for coating articles, for example articles of electric equipment, for coating fabrics, and for the protection of various supports. They may be applied by any of the usual methods: dipping, application by means of a squeegee, extrusion or spraying, depending upon the proposed use and the type of composition employed. They are particularly suitable in applications in which any acid product or any product having a basic reaction must be rigidly excluded.

The curing proceeds by simple exposure to a moist atmosphere. The moisture present in the ambient air is generally sufficient for this treatment, but it is also possible to expose the product which is to be cured to an atmosphere artificially charged with moisture. Although the curing can take place without difficulty at room temperature, that is to say at about 15–20° C., it is possible, if desired, to operate in a hotter atmosphere and such a moist hot atmosphere may comprise steam from boiling water.

The duration of the curing may vary within fairly wide limits. It depends upon the nature of the diorganopolysiloxane, upon the proportion of silicic and titanic or zirconic esters in the composition, upon the thickness of the application, upon the degree of humidity and upon the temperature. At ambient temperature and in air, the compositions according to the invention are normally cured in a period between several hours and 2 to 5 days, depending upon the other factors concerned.

The following examples illustrate the invention:

*Example I*

A dimethylpolysiloxane oil is prepared by heating for three and a half hours at 150° C. 5,000 gms. of octamethylcyclotatrasiloxane (melting point: 17.5° C.) with 5 gms. of a 10% aqueous potassium hydroxide solution. An oil is obtained, the viscosity of which at 150° C. is 25,000 centistokes. 27 gms. of water are added thereto in small fractions in 3 hours 40 minutes. The viscosity of the liquid is then 250 centistokes at 150° C. The mixture is allowed to cool for 15 hours, whereafter the potassium hydroxide is neutralised by stirring with 50 gms. of silica marketed under the name Hi-Sil X 303. The liquid obtained, which has a viscosity of 2,500 centistokes at 25° C., is thereafter heated in a current of dry nitrogen at about 195–200° C. in order to eliminate the volatile products and to remove all traces of water. An oil having a viscosity of 4,800 centistokes at 25° C. is obtained, of which the percentage by weight of hydroxyl groupings, determined by Zerewitinoff's method, was found to be equal to 0.2%, which corresponds to 0.87 hydroxyl grouping to 100 silicon atoms.

*Example II*

(a) Into an apparatus provided with a stirrer are introduced in an anhydrous atmosphere, 100 gms. of oil prepared as in Example I, 3 gms. of ethyl orthosilicate and 1 gm. of butyl orthotitanate. After mixing for 1 hour at 20° C., a thick translucent liquid is obtained. This liquid is stored in the absence of mosture in aluminum tubes. A sample of the freshly prepared mixture is spread in a thin layer (1 mm. thick) in the ambient air. It is found that after 24 hours it has become converted into a solid, elastic sheet. After storage for 3 months, the product kept in tubes has not changed in appearance and, when spread in a thin layer in the air, it sets in the same time as the product applied immediately after manufacture.

For purposes of comparison, trials (b) and (c) similar to trial (a) but omitting first the orthotitanate and then the orthosilicate, are carried out as follows:

(b) Again operating in an absolutely dry atmosphere, 50 gms. of siloxane oil prepared as in Example I are mixed with 2 gms. of ethyl orthosilicate and an easily flowing liquid is obtained which, when left in a thin layer in the ambient air, is still liquid after 1 week.

(c) 0.5 gms. of butyl titanate is added to 50 gms. of the siloxane oil. There is an almost instantaneous conversion into a jelly having no cohesion, which is still in the same state after having been exposed to the air for 6 days.

A similar composition, containing 2 gms. of butyl titanate instead of 0.5 gm. exhibits the same behaviour.

*Example III*

By proceeding as in Example II(a), but replacing the ethyl orthosilicate by 3.7 gms. of cyclohexyl polysilicate containing 13 silicon atoms per molecule ($d^{20}=1.083$; Si%=10.9), a composition is obtained which, when applied in a layer 1 mm. thick, is converted into an elastic mass after 5 days.

*Example IV*

By proceeding as in Example II(a), but replacing the butyl titanate by 1.7 gms. of octyleneglycol titanate ($d=0.947$; Ti%=7.3), a composition is obtained which can be cured in a thin layer in 48 hours.

*Example V*

Into the apparatus employed in Example II are introduced 50 gms. of dimethylpolysiloxane oil prepared under the conditions of Example I. 5 gms. of silica of combustion and 25 g. of diatomaceous silica are added with stirring. The mass is stirred for one and a half hours in order to homogenise it, 50 gms. of the same silicone oil are added and the mixture is heated for 2 hours at 135–145° C. while a current of dry nitrogen is passed through the apparatus. After cooling, 3.9 gms. of ethyl orthosilicate and 1.7 gms. of butyl titanate polymer (Ti%: 10.8) in solution in butyl acetate are added, again with stirring. The product is heated for 1 hour at 100° C. and then allowed to cool. A paste is obtained, of which one part is transferred, in the absence of moisture, into fluid-tight containers and the other part, after dilution to 50% in anhydrous cyclohexane, is also packed in fluid-tight containers.

With the product in the form of a paste, a moulding is made in a round steel dish (diameter 3.5 cm., height 1 cm.) previously coated with a layer of mould release agent (product marketed under the name Teepol). After exposure to the air for one and a half days, an elastic solid is obtained which can readily be removed from the mould, both with a sample of freshly prepared product and with a sample of product kept for 8 months.

Another part of the product in paste form is spread on a glass plate coated with Teepol. There is thus obtained after 15 hours a sheet 3 mm. thick which can be detached from the glass plate. There are cut from the sheet thus cured test pieces of the type H 3 (standard AFNOR T 46-002), on which mechanical tests give the following results:

Tensile strength _____ 21.5 kg./cm.$^2$.
Elongations at rupture _____ 430%.

The freshly dissolved product (viscosity 5,900 centistokes at 20° C.) is applied to a cotton fabric by dipping. After exposure to the air for 10 hours, a flexible, elastic coating is obtained. The quantity of product fixed on the fabric was 73 gms. per sq. metre. The same result is obtained with the product kept for 8 months.

*Example VI*

By producing as in Example I, but starting with octamethylcyclotetrasiloxane and octaphenylcyclotetrasiloxane, a methylphenyl polysiloxane oil having a viscosity of 9,150 centistokes at 20° C. is prepared. To 50 gms. of this oil are added with stirring 5 gms. of silica of combustion and 25 gms. of diatomaceous silica. The mixture is stirred for one and a half hours to effect good homogenisation, whereafter 50 gms. of oil are again added and the mixture is heated for 2 hours at 135–145° C. under a current of dry nitrogen. The mass is allowed to cool and 3.9 gms. of ethyl orthosilicate and 1.3 gms. of butyl orthotitanate are added, the stirring being continued. The whole is heated for one and a half hours at 90–100° C., cooled and packed in tubes under a dry atmosphere.

A sample of the product, taken immediately after preparation and spread in a thin layer 1 mm. thick is converted in 15 hours into an elastic solid.

The product kept in tubes for 7 months had not changed in appearance. It could be spread in a thin layer which cured in the air in the same way as the freshly prepared product.

*Example VII*

Into an apparatus provided with a stirrer are introduced, in an anhydrous atmosphere, 100 grams of oil prepared as in Example I. There are then added first 3 grams of ethyl orthosilicate and then 1 gram of tetrabutyl orthozirconate (Zr%=23.75, $d_{20}$ 1.119). After heating for 1 hour at 100° C. while stirring, there is obtained a freely flowing oil which is packed in tubes sealed against moisture. After two months' storage, a portion of the oil is withdrawn, placed in aluminium dish and left in the open (moist) air. After 48 hours the liquid is converted into a slightly sticky rubbery mass.

We claim:

1. A composition of matter, stable under anhydrous conditions and curable under moist conditions, containing as sole reactive constituents
    (a) a liquid diorganopolysiloxane having a linear structure consisting of units having the formula $R_2SiO$ and having hydroxyl end groups, each of the radicals R attached to silicon being selected from the groups consisting of hydrocarbon radicals and halogenated hydrocarbon radicals,
    (b) a silicic ester selected from the group consisting of products having the formula $Si(OR')_4$ and condensation products, containing up to 25 silicon atoms per molecule, produced by partial hydrolysis of esters of the said formula, wherein R' represents a hydrocarbon radical selected from the group consisting of alkyl radicals containing from 1–18 carbon atoms, phenyl groups, aralkyl groups and cycloaliphatic groups, and
    (c) an ester selected from the group consisting of products having the formula $M(OR'')_4$ and condensation products, containing up to 5 atoms of M per molecule, produced by hydrolysis of esters of the said formula, wherein M is a metal selected from the group consisting of titanium and zirconium and R'' is a hydrocarbon radical selected from the group consisting of alkyl radicals containing at most 18 carbon atoms and cycloaliphatic radicals.

2. A composition of matter, stable under anhydrous conditions and curable under moist conditions, consisting of a substantially anhydrous mixture, sealed in a fluid-tight container, having as sole reactive constituents
    (a) a liquid diorganopolysiloxane having a linear structure consisting of units having the formula $R_2SiO$ and having hydroxyl end groups, and a viscosity at 25° C. in the range of 500 to 500,000 centistokes, each of the radicals R attached to silicon being selected from the group consisting of hydrocarbon radicals and halogenated hydrocarbon radicals,
    (b) a silicic ester selected from the group consisting of products having the formula $Si(OR')_4$ and condensation products, containing up to 25 silicon atoms per molecule, produced by partial hydrolysis of esters of the said formula, wherein R' represents a hydrocarbon radical selected from the group consisting of alkyl radicals containing from 1–18 carbon atoms, phenyl groups, aralkyl groups and cycloaliphatic groups, and
    (c) an ester selected from the group consisting of products having the formula $M(OR'')_4$ and condensation products, containing up to 5 atoms of M per molecule, produced by hydrolysis of esters of the said formula, wherein M is a metal selected from the group consisting of titanium and zirconium and R'' is a hydrocarbon radical selected from the group consisting of alkyl radicals containing at most 18 carbon atoms and cycloaliphatic radicals.

3. A composition as claimed in claim 2, containing an inert mineral filler.

4. A composition as claimed in claim 2, containing an inert organic liquid diluent.

5. A composition of matter, stable under anhydrous conditions and curable under moist conditions, consisting of a substantially anhydrous mixture, sealed in a fluid-tight container, having as sole reactive constituents
    (a) a liquid diorganopolysiloxane having a linear structure consisting of units having the formula $R_2SiO$ and having hydroxyl end groups, and a viscosity at 25° C. in the range of 500 to 500,000 centistokes, each of the radicals R attached to silicon being selected from the group consisting of hydrocarbon radicals and halogenated hydrocarbon radicals,
    (b) a silicic ester selected from the group consisting of tetraalkyl silicates having 2–4 carbon atoms in the alkyl groups and condensation products, containing up to 25 silicon atoms per molecule, produced by partial hydrolysis of said silicates, and
    (c) an ester selected from the group consisting of products having the formula $M(OR'')_4$ and condensation products, containing up to 5 atoms of M per molecule, produced by hydrolysis of esters of the said formula, wherein M is a metal selected from the group consisting of titanium and zirconium and R'' is a hydrocarbon radical selected from the group consisting of alkyl radicals containing 2–4 carbon atoms.

6. A composition as claimed in claim 5, containing an inert mineral filler.

7. A composition as claimed in claim 5, containing an inert organic liquid diluent.

8. A composition of matter, stable under anhydrous conditions and curable under moist conditions, consisting of a substantially anhydrous mixture, sealed in a fluid-tight container, having as sole reactive constituents tetraethyl silicate, tetrabutyl titanate and a liquid dimethylpolysiloxane having a linear structure consisting of units of the formula $(CH_3)_2SiO$, having hydroxyl end groups and having a viscosity at 25° C. in the range of 2,000 to 50,000 centistokes.

9. A composition as claimed in claim 8, containing an inert mineral filler.

10. A composition as claimed in claim 8, containing an inert organic liquid diluent.

References Cited in the file of this patent

UNITED STATES PATENTS

| | | |
|---|---|---|
| 2,897,869 | Polmanteer | Aug. 4, 1959 |
| 2,902,467 | Chipman | Sept. 1, 1959 |

FOREIGN PATENTS

| | | |
|---|---|---|
| 216,878 | Australia | Aug. 28, 1958 |